(12) United States Patent
Spina et al.

(10) Patent No.: US 10,476,985 B1
(45) Date of Patent: Nov. 12, 2019

(54) SYSTEM AND METHOD FOR RESOURCE MANAGEMENT AND RESOURCE ALLOCATION IN A SELF-OPTIMIZING NETWORK OF HETEROGENEOUS PROCESSING NODES

(71) Applicant: V2COM, Inc., Austin, TX (US)

(72) Inventors: Guilherme Spina, São Paulo (BR);
Leonardo de Moura Rocha Lima, Austin, TX (US)

(73) Assignee: V2COM S.A., Sao Paulo (BR)

( * ) Notice: Subject to any disclaimer, the term of this patent is extended or adjusted under 35 U.S.C. 154(b) by 108 days.

(21) Appl. No.: 15/948,861

(22) Filed: Apr. 9, 2018

Related U.S. Application Data

(63) Continuation-in-part of application No. 15/143,143, filed on Apr. 29, 2016, now Pat. No. 10,063,658.

(51) Int. Cl.
*H04L 29/08* (2006.01)
*G06F 9/50* (2006.01)
*G06F 9/48* (2006.01)

(52) U.S. Cl.
CPC ............ *H04L 67/32* (2013.01); *G06F 9/4881* (2013.01); *G06F 9/5005* (2013.01); *G06F 9/5077* (2013.01); *H04L 67/1076* (2013.01)

(58) Field of Classification Search
None
See application file for complete search history.

(56) References Cited

U.S. PATENT DOCUMENTS

| | | | |
|---|---|---|---|
| 2009/0103453 A1* | 4/2009 | Hand | H04J 14/0284 370/254 |
| 2014/0351451 A1* | 11/2014 | Fu | H04L 65/4076 709/231 |
| 2015/0074198 A1* | 3/2015 | Liu | G06Q 10/00 709/204 |

* cited by examiner

*Primary Examiner* — Brian Whipple

(57) ABSTRACT

A method for distributed processing includes receiving a processing request at an orchestrator, and identifying one or more tasks within the processing request. The method further includes the operations of apportioning the one or more tasks of the processing request to a set of nodes of the network for processing, the apportioning based on a scorecard for each node of the set of nodes, receiving, via the network interface, a completed task from a node of the set of nodes and performing a determination whether the completed task was processed by a node in the token network. Additionally, the method includes updating a value of a progress metric for the node not in the token network, performing a determination whether the value of the progress metric exceeds a predetermined value, and when the value of the progress metric exceeds a predetermined value, adding the node to the token network.

20 Claims, 5 Drawing Sheets

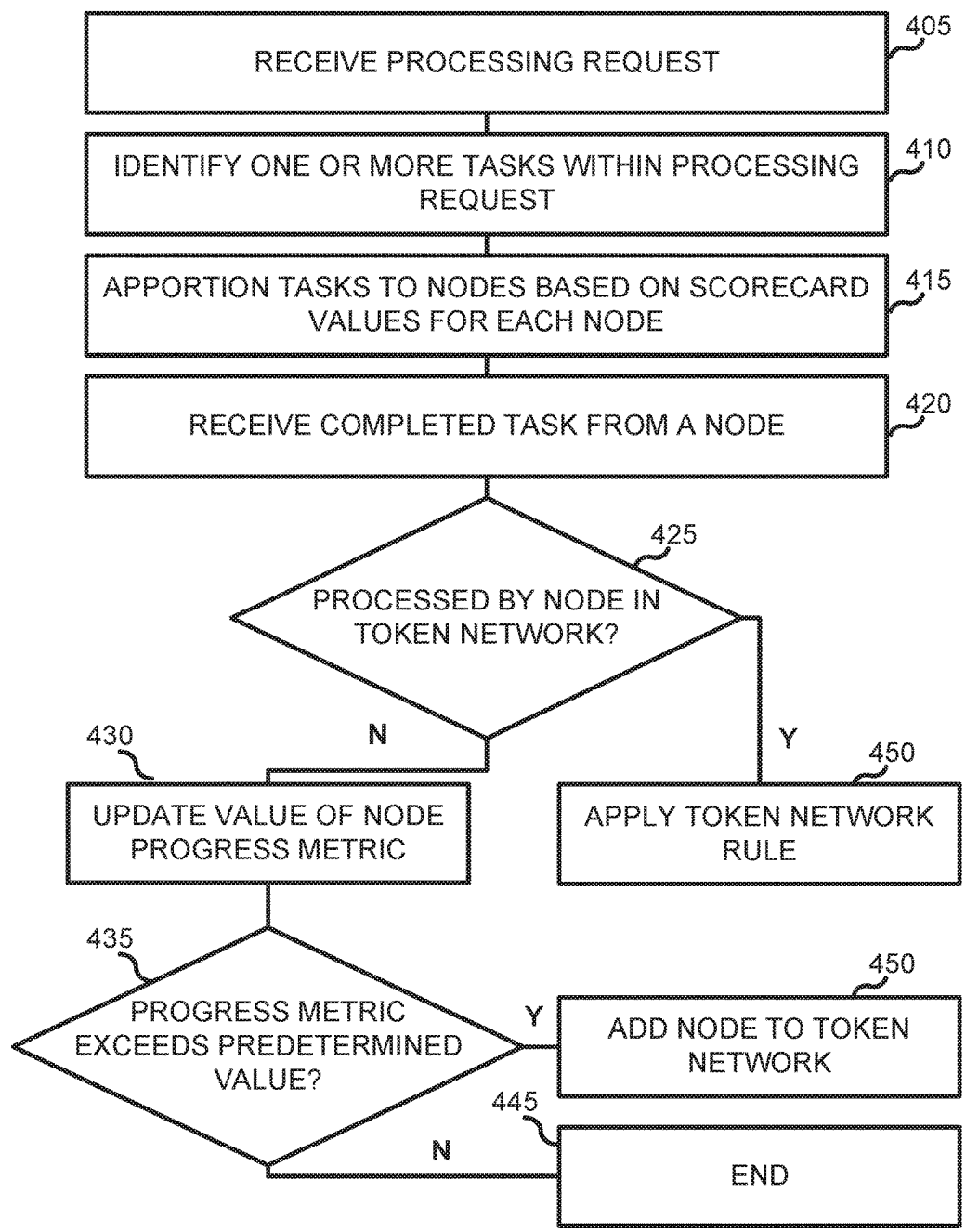

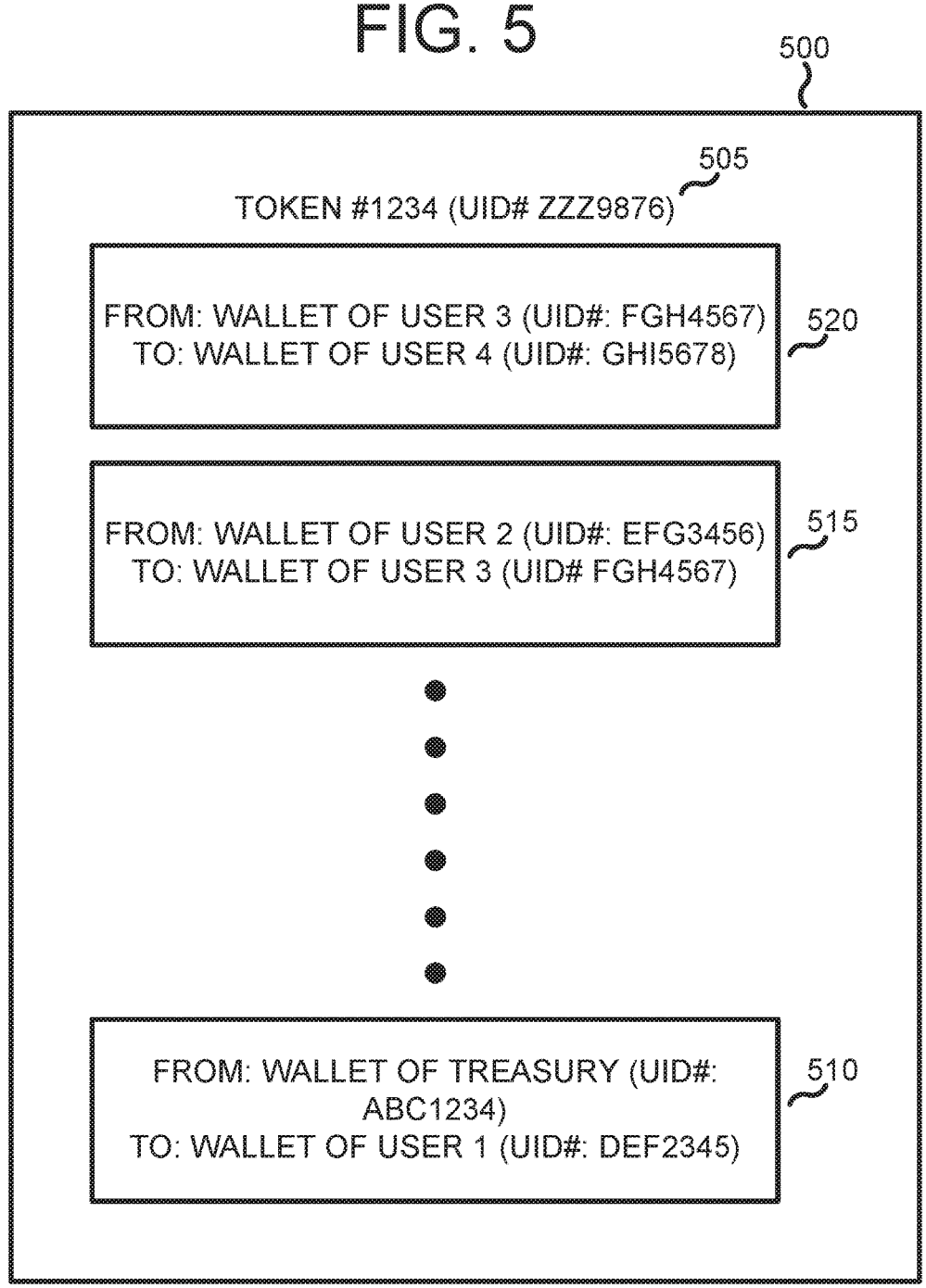

SYSTEM AND METHOD FOR RESOURCE MANAGEMENT AND RESOURCE ALLOCATION IN A SELF-OPTIMIZING NETWORK OF HETEROGENEOUS PROCESSING NODES

CROSS-REFERENCE TO RELATED APPLICATION AND CLAIM OF PRIORITY

This application is a continuation-in-part of U.S. application Ser. No. 15/143,143 entitled "DEDICATED NETWORK PLATFORM FOR DATA PRODUCING DEVICES THAT EMULATES DISTINCT DATA AND CONTROL CHANNELS VIA BIFURCATION OF SINGLE CHANNEL ENVIRONMENTS" filed Apr. 29, 2016 and claiming priority to U.S. Provisional Application No. 62/155,094, filed Apr. 30, 2015. This application is a continuation-in-part of U.S. application Ser. No. 15/143,047 entitled "CONTROL SYSTEM WITH PERSISTENT AND TRANSIENT DATA STORES FOR REGISTRATION, PRODUCTION AND STATUS DATA FOR NETWORKED DEVICES" filed Apr. 26, 2016 and claiming priority to U.S. Provisional Application No. 62/155,094, filed Apr. 30, 2015. This application claims priority under 35 U.S.C. § 119(e) to U.S. Provisional Patent Application No. 62/637,267 entitled "SYSTEM AND METHOD FOR SECURE DISTRIBUTED PROCESSING ACROSS NETWORKS OF HETEROGENEOUS PROCESSING NODES" filed on Mar. 1, 2018. This application claims priority under 35 U.S.C. § 119(e) to U.S. Provisional Patent Application No. 62/650,659 filed on Mar. 30, 2018 entitled "SYSTEM AND METHOD FOR RESOURCE MANAGEMENT AND RESOURCE ALLOCATION IN A SELF-OPTIMIZING NETWORK OF HETEROGENEOUS PROCESSING NODES." The above-identified provisional patent applications are hereby incorporated by reference in their entireties.

TECHNICAL FIELD

This disclosure relates generally to distributed computing. More specifically, this disclosure relates to systems and methods for resource management and resource allocation in a self-optimizing network of heterogeneous processing nodes.

BACKGROUND

Technological advances (such as the development of small, lower power packet data radios), consumer demand (for example, widespread demand for smartphones) and paradigm shifts in how people perceive computers (for example, the move from an "internet of computers" towards an "internet of things (IoT)") have produced a geometric growth in the number and type of devices which may be considered "networked computers." Whereas the term "networked computers" previously encompassed a narrow range of devices (for example, laptops, desktops and servers) operating using a limited range of communication protocols, the term now embraces a broad range of heterogeneous computing platforms connected across a variety of networking protocols. Networked computers now include, without limitation, home IoT controllers (for example, the Amazon Echo), gateway devices (for example, the Neuron and Dendrion devices manufactured by V2COM, Inc.), smartphones, as well as desktop, laptop and server computers.

However, much of this newly-created networked computing power is tied to function-specific devices with large amounts of downtime in between use cycles (for example, home automation systems may have significant processing and memory resources to support operations such as voice or face recognition, which go unused during the day, when houses are typically empty). In addition to experiencing large periods of downtime between use cycles, much of this newly-created networking computing power is balkanized and connected only to a small number of devices within a tiny network and to a vendor's server. For example, a home automation controller may likely only be communicatively connected to IoT devices within a home, one or two recognized user terminals (e.g., smartphones, tablets or laptop computers) and a manufacturer's server (for example, a server hosted by Amazon or Google).

The above-described proliferation of networked computers presents a wealth of untapped computing power to support distributed computing on a previously unimaginable scale. However, seizing this bounty of latent computational horsepower presents a number of technical challenges, such as how to achieve efficient allocation of heterogeneous distributed processing resources, how to optimally onboard diffuse computing resources as nodes of a distributed network and how to regulate access and maintain the security of private data on devices which are nodes of the network.

Embodiments as described herein are addressed to providing systems, methods and data structures by which diffuse, heterogeneous networked computers can be brought together as a federation of secure nodes of a self-optimizing processing network.

SUMMARY

This disclosure provides systems and methods for resource management and resource allocation in a self-optimizing network of heterogeneous processing nodes.

In a first embodiment, a method for distributed processing includes the operations of receiving a processing request at an orchestrator, the orchestrator comprising a processor, a network interface, and a memory, the orchestrator connected via the networking interface to a network of processing nodes, the network of processing nodes comprising a token network, and identifying one or more tasks within the processing request. The method further includes the operations of apportioning, via the network interface, the one or more tasks of the processing request to a set of nodes of the network for processing, the apportioning based on a scorecard for each node of the set of nodes, receiving, via the network interface; a completed task from a node of the set of nodes and performing a determination whether the completed task was processed by a node in the token network. Additionally, the method includes updating a value of a progress metric for the node not in the token network in response to a determination that the completed task was processed by a node not in the token network, performing a determination whether the value of the progress metric exceeds a predetermined value, and in response to a determination that the value of the progress metric exceeds a predetermined value, adding the node to the token network.

In a second embodiment, an orchestrator includes a processor, a network interface connected to a network of processing nodes, the network of processing nodes comprising a token network; and a memory containing instructions. When the instructions in the memory are executed by the processor, they cause the orchestrator to receive a processing request, identify one or more tasks within the processing request, and apportion, via the network interface, the one or more tasks of the processing request to a set of nodes of the network for processing, the apportioning based on a scorecard for each node of the set of nodes. Further, the instructions, when executed by the processor, cause the orchestrator to receive; a completed task from a node of the set of nodes, perform a determination whether the completed task was processed by a node in the token network, and in response to a determination that the completed task was processed by a node not in the token network, update a value of a progress metric for the node not in the token network. Additionally, the instructions in memory, when executed by the processor, cause the orchestrator to perform a determination whether the value of the progress metric exceeds a predetermined value, and in response to a determination that the value of the progress metric exceeds a predetermined value, add the node to the token network.

In a third embodiment, a non-transitory computer-readable medium contains program code, which when executed by a processor, causes an orchestrator to receive a processing request via a network interface of the orchestrator connected to a network of processing nodes, the network of processing nodes comprising a token network, identify one or more tasks within the processing request and apportion, via the network interface, the one or more tasks of the processing request to a set of nodes of the network for processing, the apportioning based on a scorecard for each node of the set of nodes. Additionally, the non-transitory computer-readable medium contains program code, which when executed by the processor, causes the orchestrator to receive, via the network interface; a completed task from a node of the set of nodes, perform a determination whether the completed task was processed by a node in the token network, in response to a determination that the completed task was processed by a node not in the token network, update a value of a progress metric for the node not in the token network, and perform a determination whether the value of the progress metric exceeds a predetermined value. Further, the non-transitory computer-readable medium contains program code which, when executed by the processor, causes the orchestrator to add the node to the token network in response to a determination that the value of the progress metric exceeds a predetermined value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates operations of a method according to certain embodiments of this disclosure; and FIG. 5 illustrates an example of a data structure for tracking membership in a token network according to certain embodiments of this disclosure.

DETAILED DESCRIPTION

FIGS. 1 through 5, discussed below, and the various embodiments used to describe the principles of this disclosure in this patent document are by way of illustration only and should not be construed in any way to limit the scope of the disclosure.

Figure 1:
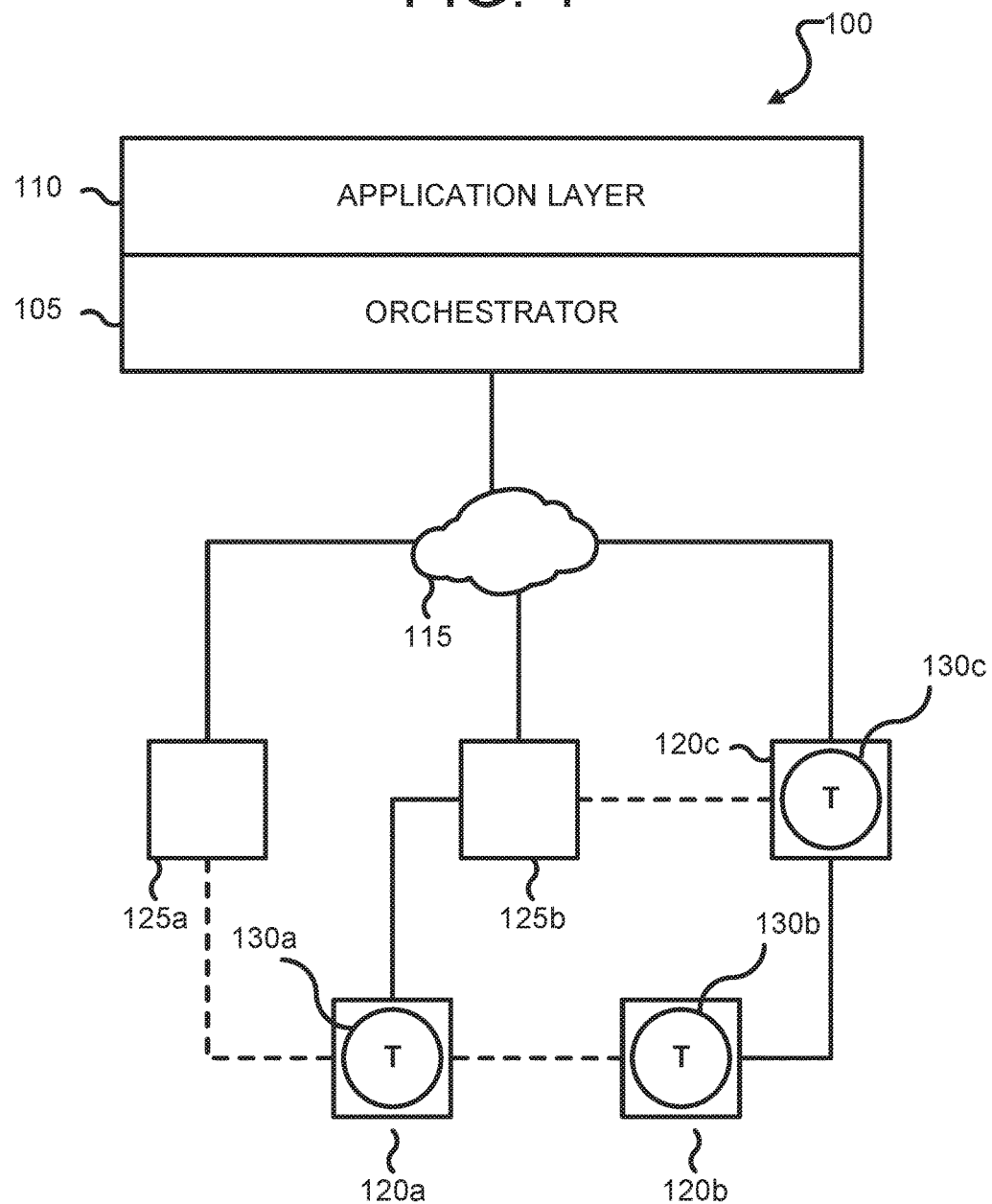
FIG. 1 illustrates an example of a network context including an orchestrator and token network according to certain embodiments of this disclosure.

FIG. 1 illustrates an example of a network context 100 including an orchestrator and a token network according to this disclosure.

According to certain embodiments, network context 100 includes an orchestrator 105, an application layer 110, one or more networks 115, one or more heterogeneous processing nodes 120a-c which belong to a token network, and one or more heterogeneous processing nodes 125a-b not belonging to the token network.

In the non-limiting example of FIG. 1, orchestrator 105 is a management server, such as a Hewlett-Packard Proliant™ server embodied on a single server rack. According to certain embodiments, orchestrator 105 includes program code, which when executed by one or more cores of orchestrator 105's processors, causes it to receive a processing request via a network interface (for example network interface 225 in FIG. 2) to be processed by one or more nodes of a distributed processing network (for example token network nodes 120a-c and/or non-token network nodes 125a-b). The program code, when executed by the processor, further causes the orchestrator to identify one or more tasks within the processing request and apportion, via the network interface, the one or more tasks of the processing request to a set of nodes of the network for processing, the apportioning based on a scorecard for each node of the set of nodes. Additionally, the program code, when executed by the processor, causes the orchestrator to receive, via the network interface; a completed task from a node of the set of nodes, perform a determination whether the completed task was processed by a node in the token network, in response to a determination that the completed task was processed by a node not in the token network, update a value of a progress metric for the node not in the token network, and perform a determination whether the value of the progress metric exceeds a predetermined value. Additionally, when executed by the processor, the program code causes the orchestrator to add the node to the token network in response to a determination that the value of the progress metric exceeds a predetermined value.

Multiple architectures for implementing orchestrator 105 are possible and within the scope of this disclosure. According to some embodiments, orchestrator 105 is a single server, and in other embodiments, orchestrator 105 may comprise multiple physical servers. In some embodiments, orchestrator 105 is implemented on one or virtual machines (VMs). According to still other embodiments, orchestrator 105 is implemented in the cloud, across a variety of machines. According to still further embodiments, orchestrator 105 is implemented on a command center, such as described in U.S. Provisional Application No. 62/637,267 filed Mar. 1, 2018.

According to various embodiments, orchestrator 105 receives processing requests, or jobs to be processed by the networked computing platforms comprising nodes (for example nodes 120a-c and nodes 125a-b) of one or more networks of heterogeneous processing nodes. As will be discussed in greater detail herein, in some embodiments, orchestrator 105 breaks the processing request down into constituent tasks to be apportioned to nodes within the one or more heterogeneous networks. In some cases, the orchestrator may select processing nodes, and apportion the constituent tasks of a processing job to selected nodes based on one or more properties of the processing nodes which are known to the orchestrator. In some embodiments, each processing node may maintain a "scorecard" of relevant metrics of its capability (e.g., processor speed, available memory, sensor capabilities, etc.). In other embodiments, "scorecards" for each processing node of the network are maintained at the orchestrator or at a data repository (for example, a database) accessible to the orchestrator and one or more nodes of the network.

Given the potential heterogeneity of the devices at processing nodes 120a-c and 125a-b and the fact that certain processing nodes "moonlight," or perform processing tasks apportioned by the orchestrator in addition to performing tasks as part of an originally intended functionality, machine level characteristics (for example, processor speed, available memory, sensor characteristics, et cetera) of a particular node may not always accurately reflect the computational value of the node's contribution to a processing network. As a non-limiting example, consider two devices constituting processing nodes of a network to which an orchestrator (for example, orchestrator 105) can apportion processing tasks. Of the two devices, one has a faster processor and more memory, but less idle time than the other processor. Alternatively, a device with superior machine level characteristics may be connected to orchestrator 105 via a network that is slow, unreliable, or otherwise reduces its usefulness to a distributed processing network in a way that cannot readily be anticipated or modeled. In such cases, the machine-level characteristics of the two processing nodes may not accurately reflect the computational value (in this example, value being expressed as the probability that, at any given time, the node will be the first among two or more nodes to successfully complete the task). In some embodiments, orchestrator 105 models variances in idle time, network connectivity issue and other factors which are determinative of a processing node's computational value to a processing network. In other embodiments, such as where the number of processing nodes in the network is large or the factors affecting processing nodes' computational to the network cannot be reliably modeled, orchestrator 105 may supplement or replace modeling processing nodes' computational value, with a token-based approaches according to embodiments of this disclosure.

According to various embodiments, orchestrator 105 apportions processing tasks to processing nodes for probabilistic execution. As used herein, the concept of probabilistic execution encompasses a race between various processing nodes of a network to successfully complete an apportioned processing task. According to certain embodiments, the potential uncertainties (for example, jobs being canceled due to the processing node having to perform a native processing function, network connectivity issues, etc.) associated with any one processing node successfully performing a processing mean that processing tasks are apportioned across multiple nodes, in the expectation of an acceptably high probability that at least one processing node will successfully complete the apportioned task.

In certain embodiments of this disclosure, orchestrator 105 maintains progress metrics for each processing node within the network. A progress metric records, amongst other things, the number of races which the processing node has "won" by being the first to complete the apportioned task. When the progress metric for a processing node exceeds a predetermined value, the node is added to a token network. In some embodiments, after a node is promoted to the token network, orchestrator 105 may stop maintaining and updating the progress metric for that node.

According to various embodiments, implementation of a token network comprising processing nodes whose computational value to a network for distributed processing provides a mechanism for networks of processing nodes according to embodiments of this disclosure to self-optimize their performance as a distributed uber-computer. For example, adding proven performers to a token network can reduce the processing load at an orchestrator 105 by reducing or eliminating processing tasks associated with modeling processing nodes' computational value to a processing network. Additionally, adding proven performers may further contribute to the self-optimization of the distributed network in that probabilistic execution can be improved by including one or more members of a token network (which, by their membership in the token network, have shown their ability to reconcile their roles in the processing network with their native functionality) within the set of processing nodes to which a specific processing task is assigned.

Still further, embodiments implementing a token network according to this disclosure may provide a computationally inexpensive way of self-optimizing the performance of a distributed processing network as an uber-computer for handling processing tasks by providing an organically rising performance benchmark. Specifically, in certain embodiments, for a given processing task, orchestrator 105 apportions the task to a number of processing nodes, including one or more nodes already in the token network. In this case, the processing task becomes a race between members of the token network and non-members. For a non-member to increase the value of its progress membership and advance towards membership in the token network, it must beat current members of the token network in the race to successfully complete the apportioned task. In this way, the token network grows by adding processing nodes whose computational value to the network is greater than that of the existing nodes.

According to certain embodiments, application layer 110 comprises one or more applications which interface with orchestrator 105 and provide orchestrator 105 with processing requests. In the non-limiting example of FIG. 1, applications within application layer 110 provide processing requests to orchestrator 105 with metadata specifying processing parameters for the processing request. Processing parameters include, without limitation, processing deadlines for the processing request (for example, a date by which the job needs to be completed by), priority parameters for processing nodes of the token network (for example, where processing requests are apportioned for probabilistic execution, a priority parameter may specify a minimum percentage of token network nodes to which processing tasks are to be apportioned), output requirements for the processing request, and geographic parameters (for example, requiring that processing tasks associated with the processing request only be apportioned to processing nodes in a particular country).

According to certain embodiments, network 115 is a wired network connecting orchestrator 105 to each of heterogeneous processing nodes 120*a*, 120*c* and 120*d*. According to other embodiments, network 115 is a wireless network, such as a Wi-Fi or 3G wireless network. Network 115 hosts communications using contextually appropriate network protocols, including without limitation, HTTP, Aeron, Message Queueing Telemetry Transport (MQTT), NanoIP, ROLL (Routing Over Low power and Lossy networks), UP and UDP. Other communication protocols are possible and within the scope of the present disclosure.

According to certain embodiments, processing nodes 120*a*-*c* comprise networked processing platforms which are members of a token network, and which are capable of securely receiving processing tasks apportioned by orchestrator 105. Further, each of processing nodes 120*a*-*c* is associated with a unique identifier value stored in a memory to which orchestrator 105*a* has access. In the non-limiting example of FIG. 1, each of processing nodes 120*a*-*c* is further associated with one of tokens 130*a*-130*c*. As will be discussed in greater detail herein, in certain embodiments, each of tokens 130*a*-130*c* comprises a unique identifier maintained in a token wallet.

According to certain embodiments, processing nodes 120*a*-*c* are potentially heterogeneous with regard to their processing and job handling capacities. Facets of heterogeneity between processing nodes 120*a*-*c* include, without limitation, processing speed, available RAM, power requirements available storage, types of network connectivity (for example, Wi-Fi connectivity, 3G connectivity, GigaBit Ethernet), available sensors (for example, microphones, thermometers, cameras, barometers), processor functionality (for example, floating point processing capability, capacity for true random number generation), and number of processor cores. According to certain embodiments, processing nodes 120*a*-*c* are member devices, such as described in U.S. Provisional Patent Application No. 62/637,267, which is incorporated by reference in its entirety herein.

In some embodiments, processing nodes 125*a*-*b* comprise networked processing platforms which are not members of a token network, and capable of securely receiving processing tasks apportioned by orchestrator 105. Additionally, in the non-limiting example of FIG. 1, each of processing nodes 125*a*-*b* is associated with a unique identifier value and a value of a progress metric stored in a memory to which orchestrator 105 has read-write access.

According to certain embodiments, processing nodes 125*a*-*b* are potentially heterogeneous with regard to their processing and job handling capacities. Facets of heterogeneity between processing nodes 125*a*-*b* include, without limitation, processing speed, available RAM, power requirements available storage, types of network connectivity (for example, Wi-Fi connectivity, 3G connectivity, GigaBit Ethernet), available sensors (for example, microphones, thermometers, cameras, barometers), processor functionality (for example, floating point processing capability, capacity for true random number generation), and number of processor cores. According to certain embodiments, processing nodes 125*a*-*b* are member devices, such as described in U.S. Provisional Patent Application No. 62/637,267.

Figure 2:
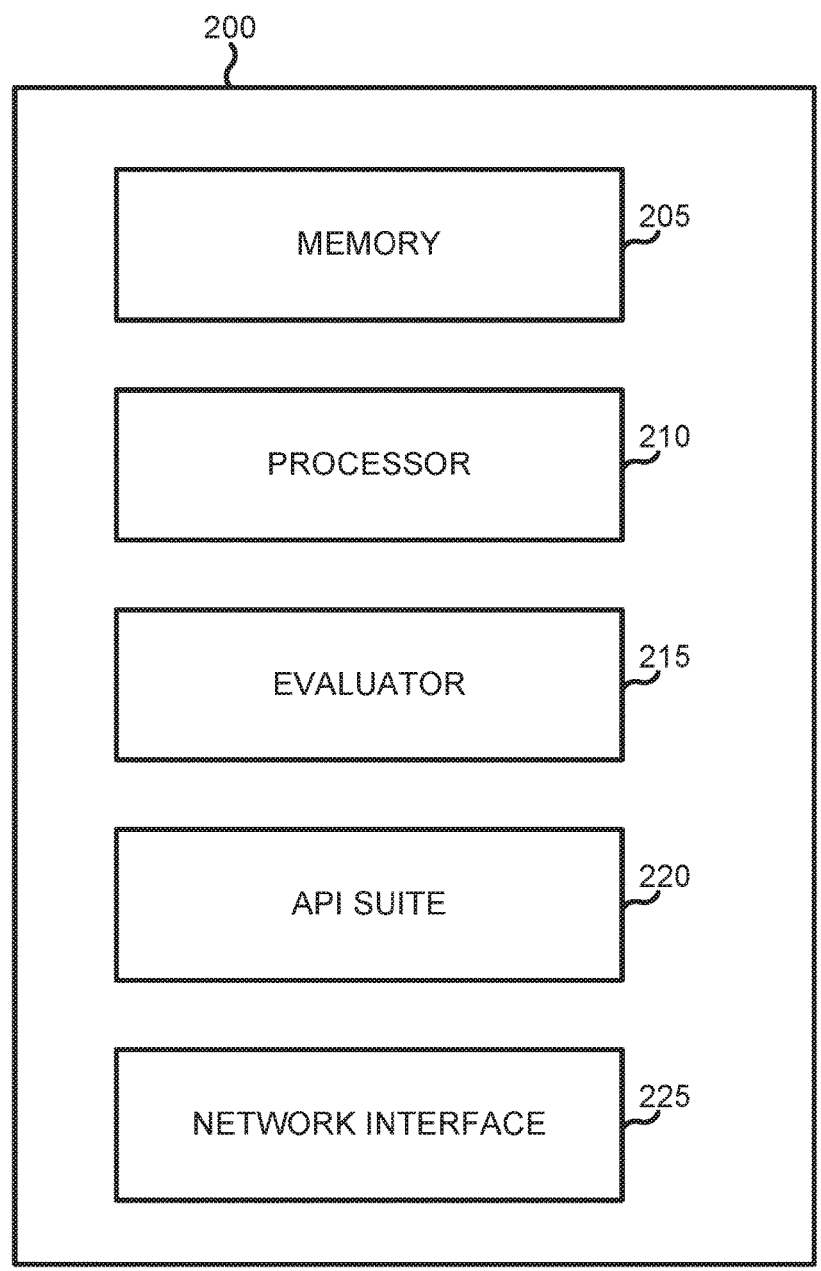
FIG. 2 illustrates an example of an orchestrator according to certain embodiments of this disclosure.

FIG. 2 illustrates an example of an orchestrator 200 according to certain embodiments of this disclosure.

According to certain embodiments, orchestrator 200 is implemented on a server computer and comprises a memory 205, a processor 210, an evaluator 215, an API suite 220 and a network interface 225. Orchestrator 200 may, in some embodiments, be a job orchestrator, such as described in U.S. Provisional Patent Application No. 62/637,267.

In the non-limiting example of FIG. 2, orchestrator 200 comprises memory 205. Memory 205 may contain one or more libraries of data (for example, scorecards) specifying the processing capabilities of processing nodes. In some embodiments, libraries of processing nodes' capabilities may be maintained at a high level of granularity, with data for each processing node, including, without limitation, information as to the device's specific processor and memory resources. Alternatively, according to other embodiments, the library of device capability information consists of a dictionary of device identifiers and a classification (e.g., "10×" or "100×") determined for the device.

Additionally, memory 205 may contain an index pairing values of progress metrics with unique identifiers of processing nodes to which orchestrator 200 can apportion processing tasks. In some embodiments, memory 205 further comprises scoring algorithms for associating processing tasks with computational value, as well as unique identifiers associating processing nodes belonging to a token network (for example, processing nodes 120a-c in FIG. 1) with unique identifiers of token wallets.

According to certain embodiments, processor 210 is a central processing unit (CPU) chip provided within a server. According to other embodiments, orchestrator 200 may be implemented across multiple servers, or as part of a cloud computing system. In such embodiments, processor 210 consists of multiple separate processors operating across a dynamically changeable cast of server machines. According to still other embodiments, orchestrator 200 may be implemented on a virtual machine, and processor 210 is a virtual CPU consisting of an assignment of processor resources of the physical machine(s) implementing the virtual machine.

In various embodiments, orchestrator 200 includes evaluator 215, which performs various pre-processing and post-processing tasks on processing requests received by orchestrator 200. According to certain embodiments, evaluator 215 parses processing requests received at the orchestrator into constituent processing tasks which can be apportioned to processing nodes. According to certain embodiments, evaluator 215, may also implement weighting algorithms or other processes to determine a metric of computational work associated with an apportioned processing task (and by implication, computational value to the processing network provided by the processing node which is the first to complete a given processing task). For example, an algorithm implemented by evaluator 215 may provide a metric of computational work based on an number of floating point operations ("flops") associated with a processing task. In another example, an algorithm implemented by evaluator 215 may provide a metric of computational work based on the volume of unprocessed data provided as part of the processing request. Numerous variations are possible and within the intended scope of this disclosure.

According to some embodiments, API suite 220 contains one or more application programming interfaces (APIs) 225a-225d for establishing communications between orchestrator 200 and processing nodes.

In the non-limiting example of FIG. 2, API suite 220 comprises one or more APIs which are capable of mapping a set of preset processing functions in a processing request (for example, to perform a hash function) to a command set for the processing nodes. In some embodiments, the preset processing functions may be expressed in an object oriented format, and as comprising methods and attributes. For example, in some embodiments, the preset functions may map to API objects of an IoT specific operating system, such as the Conera platform developed by V2COM, Inc.

According to some embodiments, the preset processing functions may be mapped to device or operating system specific commands. For example, according to some embodiments, the API may map a "hash" function in a processing request to the Java method "hashCode" which can be implemented by a processing node. Alternatively, in some embodiments, API suite 220 may comprise a single API, which maps preset functions to commands across the full spectrum of operating systems and processing capabilities found processing nodes. According to still further embodiments, individual APIs within API suite 220 may provide mappings of command center level preset functions to different data models, in order to support communications across a wide range of networking contexts and capabilities of processing nodes.

In some embodiments, network interface 225 operates to interconnect orchestrator 200 with one or more networks (for example, network 115 in FIG. 1). Network interface 225 may, depending on embodiments, have a network address expressed as a node ID, a port number or an IP address. According to certain embodiments, network interface 225 is implemented as hardware, such as by a network interface card (NIC). Alternatively, network interface 225 may be implemented as software, such as by an instance of the java.net.NetworkInterface class. Additionally, according to some embodiments, network interface 225 supports communications over multiple protocols, such as TCP/IP as well as wireless protocols, such as 3G or Bluetooth.

Figure 3:
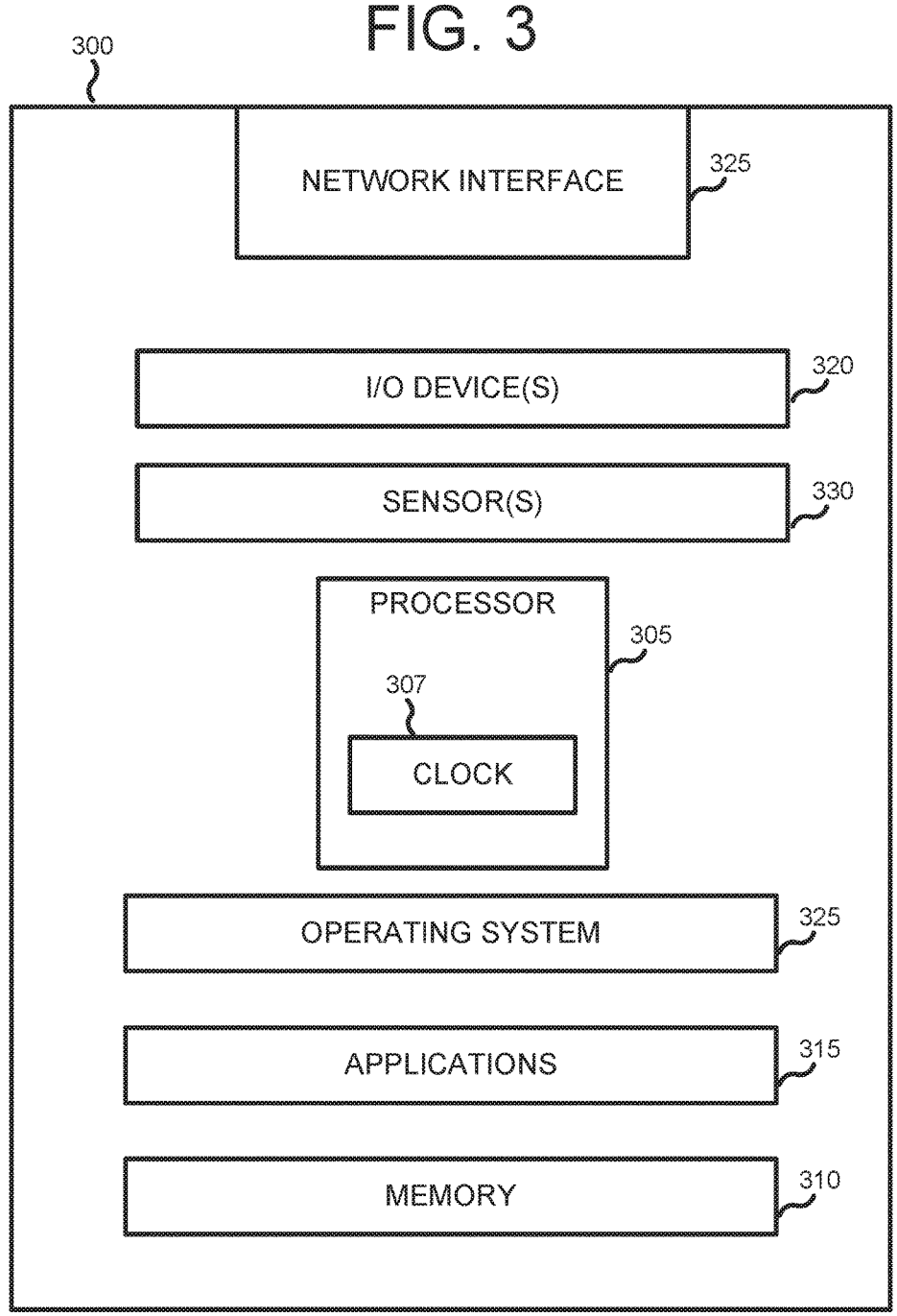
FIG. 3 illustrates an example of a processing node according to certain embodiments of this disclosure.

FIG. 3 illustrates a processing node according to various embodiments of this disclosure.

FIG. 3 illustrates an example of a processing node 300 according to certain embodiments of this disclosure. According to some embodiments, processing node 300 is a "smart" type of another device, such as a household appliance or controller of other household appliances. According to other embodiments, processing node 300 is a smartphone or a tablet computer. According to still other embodiments, processing node 300 is a networked meter, or a development board attached to a point of presence (for example, a streetlight, a switch, a traffic light or a utility pole) of a public utility. According to still further embodiments, processing node 300 can be a gateway device, such as an internet of things (IoT) gateway device. Examples of gateway devices which can function as a processing node 300 include without limitation, the Neuron C Smart Concentrator and Dendrion Power Smart Submetering Unit by V2COM, Inc. and Numerous embodiments are possible and within the scope of this disclosure.

According to certain embodiments, processing node 300 includes a processor 305. In the non-limiting example of FIG. 3, processor 305 is a multi-function processor (as opposed to, for example, a function-specific ASIC) with one or more cores, which capable of executing program code stored in a non-transitory memory 310. In the non-limiting example of FIG. 3, processor 305 includes, or is coupled with a clock 307, the speed of which provides one measure of the processor 305's processing capability. In some embodiments, processor 305 has features such as, for example and without limitation, floating point processing, true random number generation, or a smart cache, not found in the processor of other processing nodes.

According to some embodiments, memory 310 contains program code which, when executed by processor 305, causes the processor to perform the functions of the processing node 300 of which it is a part. Returning to the non-limiting example of a controller of home automation system discussed herein, memory 310 contains instructions, which when executed by processor 305, cause it to perform functions, such as reading and writing temperature data to memory 310, controlling the operation of input/output devices 320 to send control signals for devices within the home (for example, smart lightbulbs, electronically controlled heaters and air conditioners, and electronically controlled window shades). Additionally, regions of memory 310 can be allocated for data storage and storing additional program code, including one or more applications 315.

According to certain embodiments, applications 315 comprise program code or software which can be written to memory 310 and read and executed by processor 305. In the non-limiting example of FIG. 3, applications 315 include, applications associated with the core function of the processing node (for example, home automation applications, such as an application for automated control of internet connected lightbulbs), and virtual machines hosted on processing node 300.

In the non-limiting example of FIG. 3, processing node 300 has input/output devices 320. According to certain embodiments, input/output devices 320 include a display (such as an LED display), a keyboard and a mouse. According to other embodiments, I/O devices 320 are a set of input/output pins connected to pins of a processor or controller, such as processor 305.

In the non-limiting example of FIG. 3, processing node 300 has an operating system (OS) 325, which supports processing node 300's basic functions, including, without limitation, executing applications 315, receiving data from sensors 330, and sending and receiving data via network interface 325. According to some embodiments, OS 325 may be a general purpose operating system, such as Android or iOS. According to other embodiments, OS 325 may be a proprietary operating system such as Fire OS. According to still other embodiments, OS 325 is an IoT-oriented operating system, such as Conera by V2COM, Inc.

According to certain embodiments, processing node 300 includes sensors 330. In the non-limiting example of FIG. 3, sensors 330 include, without limitation, cameras, microphones, thermometers, barometric sensors, light meters, energy monitors, water meters, and rain sensors.

In some embodiments, network interface 325 operates to interconnect processing node 300 with one or more networks (for example, network 115 in FIG. 1). Network interface 325 may, depending on embodiments, have a network address expressed as a node ID, a port number or an IP address. According to certain embodiments, network interface 325 is implemented as hardware, such as by a network interface card (NIC). Alternatively, network interface 325 may be implemented as software, such as by an instance of the java.net.NetworkInterface class. Additionally, according to some embodiments, network interface 325 supports communications over multiple protocols, such as TCP/IP as well as wireless protocols, such as 3G or Bluetooth.

FIG. 4 illustrates operations of a method 400 according to this disclosure.

In the non-limiting example of FIG. 4, the operations of method 400 are performed at an orchestrator embodied on a single server platform. Other embodiments, in which the operations of method 400 are performed by multiple and/or different computing platforms (for example, a processing node, such as shown in FIG. 1) are possible and within the intended scope of this disclosure.

In some embodiments, at operation 405, the orchestrator (for example, orchestrator 105 in FIG. 1) receives a processing request. Processing requests are, in some embodiments, received from applications via one or more interfaces of the orchestrator. In other embodiments, the receipt of a processing task at the orchestrator is associated with the establishment of a smart contract between a digital wallet of the orchestrator and the digital wallet associated with a unique identifier of a party (or device) submitting the processing request. As used herein, the term processing request encompasses digital submissions to the orchestrator which define parameters of a computational task to be performed by processing nodes configured to receive processing tasks apportioned by the orchestrator. In some embodiments, processing requests are submitted as bundles of data files to be processed, along with user-defined instructions. In other embodiments, processing requests may be submitted in an object-oriented format, comprising a defined set of attributes and methods to be performed thereon. In other embodiments, processing requests may be submitted as a set of pointers to data sources to which a set of predefined operations are to be performed. Examples of computational operations which can be included in a processing request received at operation 405 include, without limitation, image recognition tasks, feature extraction (such as in a convolutional neural network), and computing hash values.

In the non-limiting example of FIG. 4, at operation 410, the orchestrator identifies one or more processing within the processing request. According to some embodiments, the identification of processing tasks within a processing tasks comprises recasting the processing request as a set of discrete, constituent processing tasks which are matched to the machine-level capabilities of processing nodes in the network.

According to certain embodiments, at operation 415, the orchestrator apportions the processing tasks identified in operation 415 to processing nodes of the processing network via a network interface, based on one or more predetermined factors. In the non-limiting example of FIG. 4, the non-limiting factors include, without limitation, values of processing node performance metrics drawn from scorecards maintained at the orchestrator. In other embodiments, the values of processing node performance metrics may be maintained at the processing nodes themselves. In certain embodiments, predetermined factors upon which apportionment of processing tasks can be based include, without limitation, indicators (such as a binary variable) indicating whether a processing node is a member of a token network, or alternatively, the value of the progress metric for a processing node which is not yet a member of a token network.

In some embodiments, as part of operation 415, the orchestrator, or a component thereof (for example, evaluator 215 shown in FIG. 2) may also compute the value of a metric representing the computational cost to the processing node (and by implication, the value of the computational work to the processing network) associated with processing the apportioned task. As discussed herein, metrics of computational cost include, without limitation, estimates of the number of flops associated with a task, or the volume of raw unprocessed data.

In some embodiments, after processing tasks are apportioned and provided the identified processing nodes via a network (for example, network 115 in FIG. 1), a race between processing nodes to be the first successfully process an apportioned processing task begins. In some embodiments, the field of processing nodes may be comprised entirely of processing nodes within the token network. In other embodiments, the field of processing nodes may include one or more processing nodes within the token network, to provide a performance benchmark, and promote the self-optimization of the processing network by requiring new additions to the token network to be higher performers than the current processing nodes of the token network.

In various embodiments, at operation 420, one of the nodes to which the processing task was apportioned at operation is the first to notify the orchestrator that it has successfully completed its processing task, and the orchestrator receives the completed task from the node. In some embodiments, the processing node notifies the orchestrator of its successful completion by providing the orchestrator with the output (for example, a calculated value or processed data) of its processing operation. In other embodiments, the orchestrator's reception of the completed task is separate from its receiving notification that the processing node has successfully completed the task.

In some embodiments, at operation 425, the orchestrator performs a determination of whether the competed processing task was completed by a processing node that is a member of a token network. In one non-limiting example, the completed processing task received at the orchestrator in operation 420 may also include a trustworthy indicator (such as a digital signature of the processing node) as to the processing node's identity. Based on the trustworthy indicator of the processing node's identity, the orchestrator determines whether the processing task was completed by a node belonging to a token network.

In the non-limiting example of FIG. 4, if the apportioned task is not processed by a node in the token network, method 400 proceeds to operation 430, wherein the orchestrator updates an existing value of a progress metric for the node identified at operation 425. In some other embodiments, the orchestrator creates a new or initial value of a progress metric for the processing node. In some embodiments, the value of the progress metric can reflect the calculated aggregate of the value (for example, a flop estimate determined by evaluator 215 in FIG. 2) of the apportioned tasks which the processing node was the first to successfully complete. Alternatively, in other embodiments, the value of the progress metric, may, depending on the overall performance requirements of the processing network, comprise the number of apportioned tasks which the processing node was the first to provide the orchestrator with a completed task. Numerous variations are possible and within the intended scope of this disclosure.

According to certain embodiments, at operation 435, the orchestrator performs a determination as to whether the updated progress metric for the processing node from which the orchestrator received the completed task at operation 420, exceeds a predetermined threshold value. For example, in embodiments in which the progress metric is keyed off of a volume of raw data in the processing request successfully completed by the node, the threshold value may be ten gigabytes (10 GB0. In such embodiments, at operation 435, the orchestrator compares the total volume of data associated with apportioned tasks which the processing node was the first among one or more processing nodes to complete against the 10 GB threshold value.

Although in the preceding example, the determination of whether the value of the progress metric for the processing node exceeds a threshold value has been described with reference to an embodiment in which every processing node is evaluated based on a single common metric and single common predetermined threshold value, the disclosure is not so limited. In some embodiments, the degree of heterogeneity among processing nodes may be such that the various processing nodes of the system may be organized into classes and a particular node's progress towards membership in the token network is determined based on a class-specific progress metric and threshold value pair. Thus, in certain heterogeneous processing networks according to embodiments of this disclosure, one class of processing nodes' progress may be assessed according to the data volume metrics described in the previous paragraph, while another class of devices (for example, devices having graphics processing units or other processors capable of simultaneously processing a large number of threads) may be assessed according to a differently denominated progress metric (for example, a number of computed hashes).

In the non-limiting example of FIG. 4, if the updated progress metric for the processing node exceeds a predetermined value, then method 400 proceeds to operation 440, wherein the processing node, whose progress metric was determined, at operation 435, to have a value exceeding a predetermined threshold value, is added to the token network. According to some embodiments, adding the processing node to the token network is computationally lightweight, and simply requires adding the node to an index of processing node identifiers. In other embodiments, the integrity of the token network may be enhanced (for example, by preventing fraudulent or unearned additions to the token network) by implementing a digital wallet and distributed ledger system. In some embodiments, each token is associated with a distributed ledger, and the orchestrator and processing nodes are associated with unique identifiers (for example, an IMEI identifier). When a processing node is added to the token network, the distributed ledger is updated to include an entry pairing the unique identifier of a token with the unique identifier of the processing node, or the digital wallet of a token holder. Once the addition of the processing node to the token network on the distributed ledger has been ratified by the machines maintaining the distributed ledger, the processing node is formally and fully added as a member of the token network.

According to certain embodiments, if the updated progress metric for the processing node does not exceed a predetermined value, then method 400 proceeds to operation 445, wherein, for the purposes of the processing task apportioned at operation 415 and the processing node, the current instance of method 400 is concluded. However, it should be noted that, in some embodiments, a given processing node may be apportioned multiple processing tasks by the orchestrator, and as such, the orchestrator may be performing multiple instances of method 400 with respect to a particular processing node.

Further, in some embodiments, if it is determined at operation 425 that the apportioned task was successfully processed by a node in the token network, method 400 proceeds to operation 450, wherein a token network rule is applied for the processing node from which the completed task was received at operation 420. According to some embodiments, application of the token network rule may comprise providing a unique identifier associated with the processing node with a reward or other proxy for value in exchange for the processing node's fast, successful completion of the processing task apportioned at operation 415.

As discussed elsewhere herein, by adding processing nodes with demonstrated computational value as members of a token network, certain embodiments according to this disclosure provide a computationally inexpensive (for example, as an alternative to attempting to model, based on the heterogeneity of computational power, network connection quality, and expected availability to perform apportioned tasks) way of self-optimizing a network of heterogeneous processing nodes as an uber-computer for distributed processing of large processing requests. According to some embodiments, processing tasks are apportioned to a set of processing nodes drawn which includes members of the token network. In this way, new additions to the token network are, in the aggregate, at least as computationally capable as the existing members of the token network. Accordingly, the processing network is self-optimized by identifying and expanding the set of processing nodes whose computational value to the network has been proven. Additionally, the processing network is further self-optimized in that, over time, the aggregate computational performance of the token network steadily rises upwards, as a result of the fact, to be added as a new member of the token network, a processing node generally must outperform current members of the token network.

Self-optimization of a network of processing nodes as an uber-computer for distributed processing of large processing requests may be extended and enhanced by enabling tokens to be securely transferred. Enabling tokens (and by implication, a processing node associated with the token holder) to be transferred can, for example, address issues arising when a change in circumstances (for example, damage to the processing node, a change in the processing node's amount of idle time, etc.) diminishes the computational value of a processing node in the token network to a distributed processing network. In certain embodiments, the token earned by the first processing node could be transferred to a second processing node, without having to wait for the second processing node to separately earn its membership in the token node. By not rigidly tying the token indicating a processing node's membership in the token network to a single specific machine, the processing nodes of the token network can be upgraded, repaired or replaced, which helps ensure that the processing nodes of the token network are able to maintain their status as proven contributors to the processing network.

FIG. 5 illustrates a data structure 500 for tracking membership in a token network according to certain embodiments of this disclosure. In the non-limiting example of FIG. 5, data structure 500 comprises an entry in a distributed ledger which is ratified by networked computers which are communicatively connected to an orchestrator (for example, orchestrator 105 in FIG. 1). In other embodiments, data structure 500 is maintained as data in the orchestrator. In other embodiments, data 500 is maintained in a structured query language (SQL) database accessible to an orchestrator. Numerous embodiments are possible and within the intended scope of this disclosure.

According to certain embodiments, for each token of a token network, at least one trusted instance of data structure 500 is maintained. In the non-limiting example of FIG. 5, the instance of data structure 500 is mapped to the unique identifier of a token 505. In this example, token #1234 is mapped to the unique identifier "ZZ9876." In some embodiments, an orchestrator may serve as a nomenclature broker for unique ID's associated with tokens. In this capacity, the orchestrator may assign unique IDs for tokens, and also verify the authenticity of unique ID's presented at the orchestrator, such as by confirming whether a unique ID matches a value in a registry maintained by the orchestrator.

In some embodiments, data structure 500 provides a trusted listing of source and destination identifiers for each transaction in the token's lifetime, beginning with a transfer from a trusted root entity.

In the non-limiting example of FIG. 5, the first entry 510 in data structure 500 represents the addition of a processing node to a network. In the transaction recorded by first entry 510, token #1234, having unique identifier #ZZZ9876 is transferred from the wallet of the treasury to the wallet of "User 1" (which is associated with unique ID #: DEF 2345). As used herein, the term "wallet" encompasses digital evidence which is trusted by processing nodes and users of the processing network as to the current ownership of a token. Wallets can, without limitation, be maintained as database entries on a trusted server, or on a distributed ledger. Further, as used herein, for the purposes of maintaining records in data structure 500, the term "user" encompasses both constituent members of the processing network (for example, orchestrator(s) and processing nodes), as well as individuals and entities who own or control processing nodes of the network. In the non-limiting example of FIG. 5, "User1" refers to a processing node whose progress metric has surpassed a threshold value.

According to certain embodiments, each transfer of a token from one user to another user is recorded in data structure 500, and gaps in the transfer chain (for example, "from a to b" then "from c to d") trigger the application of predetermined rules (for example, voiding all transactions after the gap in the transfer chain. Further, according to some embodiments, for a new entry in data structure 500 to be recognized, it may be subject to ratification by a cohort of peer machines which maintain data structure 500 as an entry in a distributed ledger.

In the non-limiting example of FIG. 5, data structure 500 is shown as maintaining a complete transfer chain from initial transfer 510 from the wallet of the treasury through to a penultimate 515 and final transfer 520. As shown in FIG. 5, token #1234 is currently held by "user 4." According to certain embodiments, a digital wallet associated with "user 4" would, subsequent to entry 530 being recorded in data structure 500, be updated to reflect "user 4's" current ownership of the token. Further, in some embodiments, to prevent fraud or settle conflicts as to token ownership, an orchestrator may implement a hierarchy between instances of data structure 500 and users' digital wallets, by which data structure 500 is agreed upon as the controlling record of token ownership.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for distributed processing, the method comprising:
   receiving a processing request at an orchestrator, the orchestrator comprising a processor, a network interface, and a memory, the orchestrator connected via the networking interface to a network of processing nodes, the network of processing nodes comprising a token network;
   identifying one or more tasks within the processing request;
   apportioning, via the network interface, the one or more tasks of the processing request to a set of nodes of the network for processing, the apportioning based on a scorecard for each node of the set of nodes;
   receiving, via the network interface; a completed task from a node of the set of nodes;
   performing a determination whether the completed task was processed by a node in the token network;
   in response to a determination that the completed task was processed by a node not in the token network, updating a value of a progress metric for the node not in the token network;
   performing a determination whether the value of the progress metric exceeds a predetermined value; and
   in response to a determination that the value of the progress metric exceeds a predetermined value, adding the node to the token network.

2. The method of claim 1, wherein the orchestrator is connected via the networking interface to the token network, the token network comprising a network of heterogeneous nodes.

3. The method of claim 1, wherein the apportioning of the one or more tasks of the processing request comprises optimizing a metric of network performance based on node property values included in the scorecard for each node of the set of nodes.

4. The method of claim 1, wherein the orchestrator is implemented on one or more nodes of the set of nodes of the processing network.

5. The method of claim 1, wherein adding the node to the token network comprises associating a unique ID of a token with a unique ID of a token wallet.

6. The method of claim 5, wherein associating the unique ID of a token with the unique ID of the token wallet comprises generating an entry in a distributed ledger.

7. The method of claim 1, further comprising:
in response to adding the node to the token network, updating a token-node index of the orchestrator to associate a unique identifier of a token with the node added to the token network.

8. An orchestrator comprising:
a processor;
a network interface connected to a network of processing nodes, the network of processing nodes comprising a token network; and
a memory containing instructions, which when executed by the processor, cause the orchestrator to:
receive a processing request;
identify one or more tasks within the processing request;
apportion, via the network interface, the one or more tasks of the processing request to a set of nodes of the network for processing, the apportioning based on a scorecard for each node of the set of nodes;
receive, via the network interface; a completed task from a node of the set of nodes;
perform a determination whether the completed task was processed by a node in the token network;
in response to a determination that the completed task was processed by a node not in the token network, update a value of a progress metric for the node not in the token network;
perform a determination whether the value of the progress metric exceeds a predetermined value; and
in response to a determination that the value of the progress metric exceeds a predetermined value, add the node to the token network.

9. The orchestrator of claim 8, wherein the orchestrator is connected via the networking interface to the token network, the token network comprising a network of heterogeneous nodes.

10. The orchestrator of claim 8, wherein the apportioning of the one or more tasks of the processing request comprises optimizing a metric of network performance based on node property values included in the scorecard for each node of the set of nodes.

11. The orchestrator of claim 8, wherein the orchestrator is implemented on one or more nodes of the set of nodes of the processing network.

12. The orchestrator of claim 8, wherein adding the node to the token network comprises associating a unique ID of a token with a unique ID of a token wallet.

13. The orchestrator of claim 12, wherein the association of the unique ID of a token with the unique ID of the token wallet comprises generating an entry in a distributed ledger.

14. The orchestrator of claim 8, wherein the memory contains instructions, which when executed by the processor, cause the orchestrator to:
in response to adding the node to the token network, update a token-node index of the orchestrator to associate a unique identifier of a token with the node added to the token network.

15. A non-transitory computer-readable medium containing program code, which when executed by a processor, causes an orchestrator to:
receive a processing request via a network interface of the orchestrator connected to a network of processing nodes, the network of processing nodes comprising a token network;
identify one or more tasks within the processing request;
apportion, via the network interface, the one or more tasks of the processing request to a set of nodes of the network for processing, the apportioning based on a scorecard for each node of the set of nodes;
receive, via the network interface; a completed task from a node of the set of nodes;
perform a determination whether the completed task was processed by a node in the token network;
in response to a determination that the completed task was processed by a node not in the token network, update a value of a progress metric for the node not in the token network;
perform a determination whether the value of the progress metric exceeds a predetermined value; and
in response to a determination that the value of the progress metric exceeds a predetermined value, add the node to the token network.

16. The non-transitory computer readable medium of claim 15, containing program code, which when executed by the processor, causes the orchestrator to connect via the networking interface to the token network, the token network comprising a network of heterogeneous nodes.

17. The non-transitory computer-readable medium of claim 15, containing program code, which when executed by the processor, causes the processor to apportion, via the network interface, the one or more tasks of the processing request to a set of nodes of the network for processing, wherein the apportioning of the one or more tasks of the processing request comprises optimizing a metric of network performance based on node property values included in the scorecard for each node of the set of nodes.

18. The non-transitory computer-readable medium of claim 15, containing program code, which when executed by the processor, causes the orchestrator to be implemented on one or more nodes of the set of nodes of the processing network.

19. The non-transitory computer-readable medium of claim 15, wherein adding the node to the token network comprises associating a unique ID of a token with a unique ID of a token wallet.

20. The non-transitory computer-readable medium of claim 19, containing program code, which when executed by the processor, causes the orchestrator to associate the unique ID of the token with the unique ID of the token wallet, wherein the association of the unique ID of a token with the unique ID of the token wallet comprises generating an entry in a distributed ledger.

* * * * *